E. E. PHINNEY.
AUTOMATIC CARRIAGE RAISING MEANS FOR CALCULATING MACHINES.
APPLICATION FILED APR. 8, 1919.
1,335,349.
Patented Mar. 30, 1920.
2 SHEETS—SHEET 1.
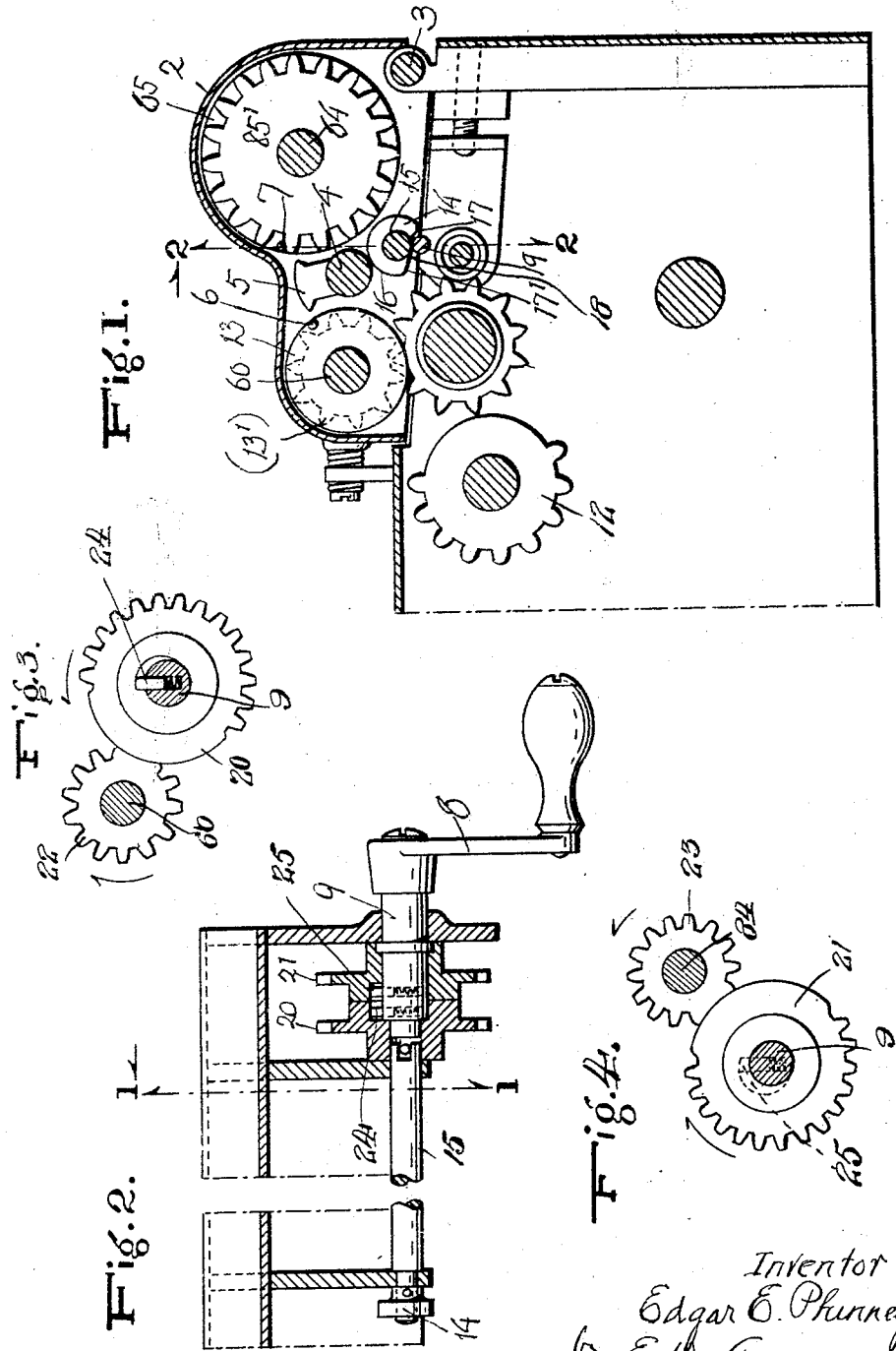
Inventor
Edgar E. Phinney
by E. W. Anderson
Attorney

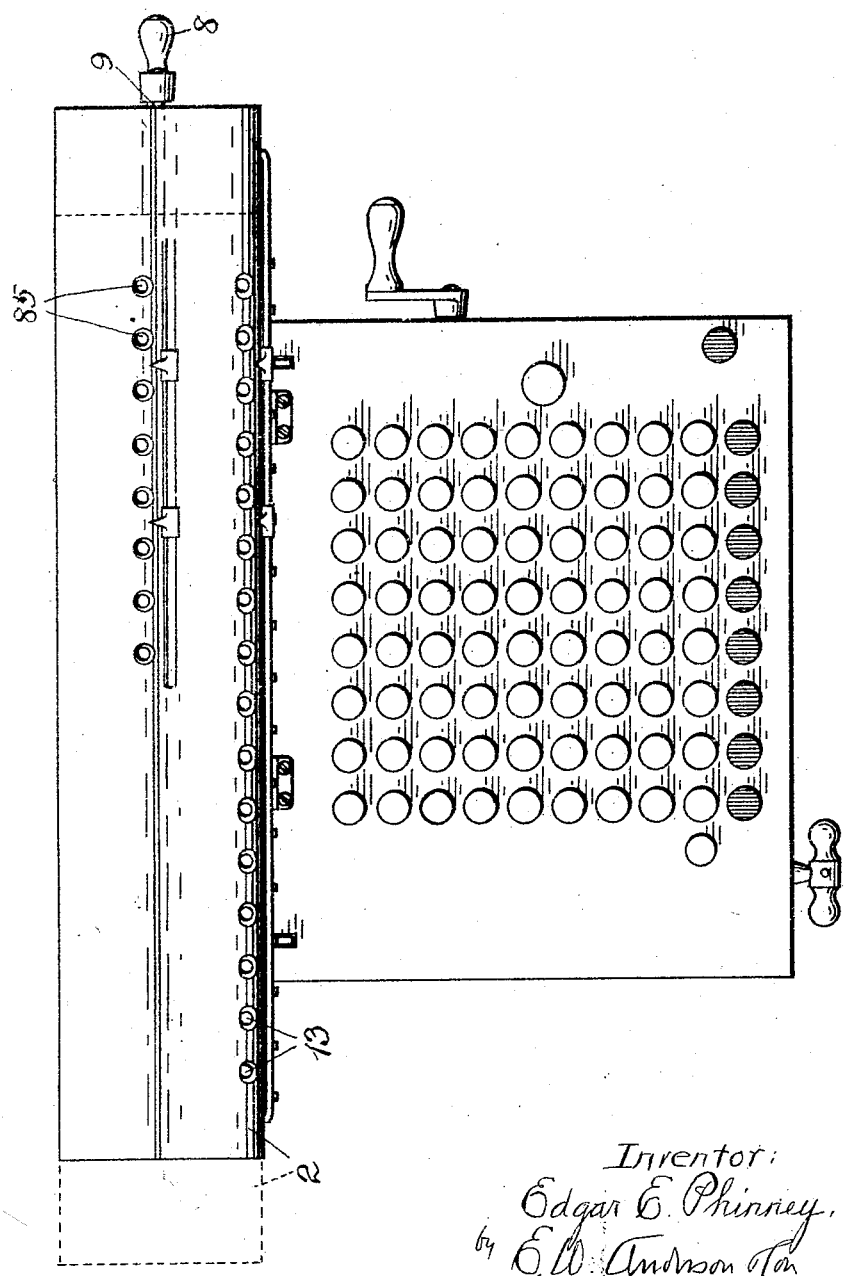

UNITED STATES PATENT OFFICE.

EDGAR E. PHINNEY, OF WEST ORANGE, NEW JERSEY, ASSIGNOR TO MONROE CALCULATING MACHINE COMPANY, OF ORANGE, NEW JERSEY, A CORPORATION OF NEW YORK.

AUTOMATIC CARRIAGE-RAISING MEANS FOR CALCULATING-MACHINES.

1,335,349.   Specification of Letters Patent.   Patented Mar. 30, 1920.

Application filed April 8, 1919. Serial No. 288,522.

*To all whom it may concern:*

Be it known that I, EDGAR E. PHINNEY, a citizen of the United States, resident of West Orange, in the county of Essex and State of New Jersey, have made a certain new and useful Invention in Automatic Carriage-Raising Means for Calculating-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to calculating machines of the type shown in the U. S. reissue patent to Baldwin, No. 13,841 dated December 8, 1914, having for its object to provide means to automatically raise the hinged carriage and maintain it in raised position while the registering wheels or dials are being cleared or set back to zero positions.

The invention consists in the novel construction and combinations of parts, as hereinafter set forth.

In the accompanying drawings illustrating the invention, Figure 1 is a sectional view on the line 1—1, Fig. 2; Fig. 2 is a section on the line 2—2, Fig. 1; Fig. 3 is a detail side view of the driving connection between operating handle 8 and shaft 60, and Fig. 4 is a similar view of the connection between said handle and the shaft 84. Fig. 5 is a plan view of a calculating machine to which the invention is applied, a second position of the carriage being indicated in dotted lines.

In the drawings the numeral 2, designates an endwise shiftable carriage, pivoted in rear at 3, said carriage having mounted thereupon a series of registering dials 13, and a parallel series of registering dials 85, the dials 13 carrying each a gear wheel 13' and the dials 85 each carrying a gear wheel 85'.

Between and parallel to the two series of registering dials 13 and 85 is located a rod or bar 4, having a series of radial projections 5, 5, spaced apart from each other and normally located without the path of movement of pins 6 and 7 of the registering dials, said bar having bearings in the carriage so that the bar and its projections may be rocked from one side to the other to bring the projections first within the path of movement of one series of wheels as 13, and as the bar is oppositely rocked, out of the path of movement of the pins of said dials and within the path of movement of the pins of the other series of dials 85.

An operating device or handle 8 is carried by a rotary shaft 9, said shaft having driving connection with the shafts 60 and 84 of the registering dials, and being adapted upon movement of the crank handle in one direction to rotate one series of dials and upon rotation of the handle in the opposite direction to rotate the other series of dials, by suitable means, preferably that shown in the U. S. patent to Baldwin, No. 1,275,119, dated August 6, 1918.

The operating handle 8 being rotated as stated, means are provided to thereby automatically raise the carriage upon its pivot to disengage the gears 13' from the intermediate gears 12 and hold the carriage in raised position while the dials 13 are being cleared or set back to zero, said means consisting preferably of a cam 14, fast upon a rotary shaft 15, driven from the dial-clearing crank 8, said cam having an arcuate portion 16, concentric with its shaft and of about 270 degrees in extent, and inward extending ends 17, 17', forming a recess 18, wherein fits normally a rod 19, located below shaft 15 and having suitable support in the frame of the machine. The end 17 of the cam is normally in contact with the rod 19, and has a radial relation to the cam, so that the carriage will be quickly and completely raised and the gears 13' and 12 instantly disengaged at the start of the rotation of the crank handle 8, this instant disengagement of the gears being important as a preliminary to setting the dials 13 back to zero.

The crank handle being rotated once completely, the carriage is lifted to the extent of the length of the cam end 17, the arcuate wall 16 of the cam then riding upon the rod 19 while the crank handle is being rotated for about 270 degrees, which suffices to set the registering dials to zero. The other end 17' of the cam will then be brought into engagement with the rod 19, and being of lesser chordal relation to the cam will lower the carriage gradually to rest, with the rod 19 again engaging the recess 18.

In the rotation of the crank handle in the opposite direction to clear the dials 84, it is not necessary that the carriage be raised pivotally, because these dials are freely rotatable reversely, not needing to be disengaged from any gears or other parts as a preliminary to the clearing thereof. Therefore the cam shaft 15 is adapted to be rotated only during the rotation of the operating shaft 9 in one direction, or in clearing the dials 13, the rotation of the shaft 9 in the opposite direction to clear the dials 85 being without effect in rotating the cam shaft.

Referring back to the patent to Baldwin No. 1,275,119, above mentioned, means are provided whereby the shaft 60 of the dials 13 is rotated in one direction to clear these dials upon rotation of the shaft 9 in one direction, and whereby upon rotation of the shaft 9 in the opposite direction, the shaft 84 is rotated to clear the other set of dials, the shaft 60 remaining stationary during the rotation of the shaft 84, this means consisting of two gears 20 and 21 (10 and 11 of the patent) upon the shaft 9, said gears driving gears 22 and 23 (12 and 14 of the patent) of the shafts 60 and 84 and having respectively oppositely acting clutch connections with the shaft 9 including spring-pressed pins 24 and 25 (15 and 16 of the patent) seated in the last named shaft and shoulders of the hubs of the gear wheels 20 and 21, said shoulders having inclined approaches, all as described in the patent. The cam shaft 15 in the present case is fast to the gear 20 of the shaft 9, and is therefore rotated only when the gear 20 is rotated to clear the dials 13, remaining idle during the rotation of the other gear 21 to clear the dials 85.

I claim:—

1. In a calculating machine, a series of gear wheels, an endwise-shiftable pivoted carriage having a series of registering dials provided each with a gear wheel in mesh with the respective first named gear wheels, means for setting the registering dials to zero, and means coöperating with the zero-setting means for automatically raising the carriage and holding it raised during the zero setting.

2. In a calculating machine, a series of gear wheels, an endwise shiftable pivoted carriage having a series of registering dials provided each with a gear wheel in mesh with the respective first named gear wheels, means for setting said registering dials to zero, and means coöperating with the zero-setting means for automatically raising the carriage and holding it raised during the zero setting including a rotary cam on said carriage and a stationary member against which it bears.

3. In a calculating machine, a casing having a series of gear wheels, an endwise shiftable pivoted carriage having a principal series of registering dials provided each with a gear wheel in mesh with the respective first named gear wheels, and a secondary series of registering dials, means including a shaft rotatable in one direction to set said principal series of dials to zero and rotatable in the opposite direction to set said secondary series of dials to zero, and means coöperating with the zero-setting means for automatically raising the carriage and holding it raised during the zero setting of the principal dials only.

4. In a calculating machine, a series of gear wheels, an endwise shiftable pivoted carriage having a principal series of registering dials provided each with a gear wheel in mesh with the respective first named gear wheels, and a secondary series of registering dials, means for setting both series of dials to zero, and means coöperating with the zero setting means for raising the carriage upon its pivot and holding it raised during the zero setting of the principal dials only.

5. In a calculating machine, a series of gear wheels, an endwise shiftable pivoted carriage having a series of registering dials provided each with a gear wheel in mesh with the respective first named gear wheels, means for setting said registering dials to zero, and means coöperating with the zero setting means for automatically raising the carriage and holding it raised during the zero setting including a rotary cam having inwardly extending ends and a recess between said ends, and a stationary member against which said cam is adapted to bear fitting in said recess.

In testimony whereof I affix my signature, in presence of two witnesses.

E. E. PHINNEY.

Witnesses:
W. R. BAUM,
GEORGE M. ANDERSON.